United States Patent [19]
Beach, Raymond J. et al.

[11] Patent Number: 5,307,430
[45] Date of Patent: Apr. 26, 1994

[54] LENSING DUCT

[75] Inventors: Beach, Raymond J.; William J. Benett, both of Livermore, Calif.

[73] Assignee: The United States of America as represented by the United States Department of Energy, Washington, D.C.

[21] Appl. No.: 983,350

[22] Filed: Nov. 30, 1992

[51] Int. Cl.$^5$ ............................................. G02B 6/26
[52] U.S. Cl. ........................................ 385/31; 385/33; 385/88; 385/93; 385/902; 359/710; 359/581; 359/589; 372/101
[58] Field of Search .............. 359/710, 580, 581, 589; 385/31, 33, 88, 89, 93, 116, 120, 900, 902; 372/69-72, 101

[56] References Cited
U.S. PATENT DOCUMENTS

| | | | |
|---|---|---|---|
| 4,009,394 | 2/1977 | Mierzwinski | 359/710 |
| 4,042,821 | 8/1977 | Mierzwinski | 359/710 |
| 4,114,592 | 9/1978 | Winston | 385/900 |
| 4,204,175 | 5/1980 | Baldwin et al. | 372/100 |
| 4,208,636 | 6/1980 | German | 372/42 |
| 4,436,363 | 3/1984 | Steinbruegge et al. | 359/589 |
| 4,496,211 | 1/1985 | Daniel | 385/31 |
| 4,521,070 | 6/1985 | Sottlin et al. | 385/31 |
| 4,568,140 | 2/1986 | van der Werf et al. | 359/581 |
| 4,630,180 | 12/1986 | Muraki et al. | 359/710 |
| 4,823,357 | 4/1989 | Casey | 372/92 |
| 4,916,712 | 4/1990 | Bender | 372/75 |
| 4,976,527 | 12/1990 | Horikawa et al. | 359/512 |
| 4,978,197 | 12/1990 | Horikawa et al. | 359/629 |
| 5,081,639 | 1/1992 | Snyder et al. | 359/710 |
| 5,155,631 | 10/1992 | Snyder et al. | 359/710 |
| 5,206,878 | 4/1993 | Sizer, II | 372/101 |

OTHER PUBLICATIONS

R. Beach et al., Passively Q-Switched Transverse-Diode-Pumped Nd$^{3+}$:YFL Laser Oscillator, Optics Letters, vol. 17, No. 2, Jan. 15, 1992.

*Primary Examiner*—Frank Gonzalez
*Attorney, Agent, or Firm*—Henry P. Sartorio; Roger S. Gaither; William R. Moser

[57] ABSTRACT

A lensing duct to condense (intensify) light using a combination of front surface lensing and reflective waveguiding. The duct tapers down from a wide input side to a narrow output side, with the input side being lens-shaped and coated with an antireflective coating for more efficient transmission into the duct. The four side surfaces are uncoated, preventing light from escaping by total internal reflection as it travels along the duct (reflective waveguiding). The duct has various applications for intensifying light, such as in the coupling of diode array pump light to solid state lasing materials, and can be fabricated from inexpensive glass and plastic.

20 Claims, 2 Drawing Sheets

LENSING DUCT

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to light intensifiers, particularly to devices for focusing down a beam of light to produce a smaller beam with a greater intensity, and more particularly to a lensing duct for intensifying light using a combination of front surface lensing and reflective waveguiding.

Traditionally, solid optically pumped lasers consist of a solid material wherein the optical gain in the material is generated by stimulated emission. The laser rod was initially optically pumped by a flash lamp or an arc source, which was generally inefficient and the heat generated by the pumping means sometimes damaged the laser rod.

In an effort to develop more efficient solid state lasers which generate higher output power and have a longer life time, the use of lateral pumping means, such as solid state laser diode arrays that are mounted on the side of a laser slab, was initiated. Various approaches for efficient transfer of the energy from the diode arrays to the solid laser rod or slab have been developed, which include the use of reflective coatings, optical waveguides, collimating lenses, and prisms.

One of the existing problems associated with the use of large diode arrays to pump lasing material is effectively concentrating the light from a diode array onto the laser slab or rod. The present invention provides a solution to that problem by condensing and increasing the intensity of pump light from a diode array onto a solid laser rod by a combination of front surface lensing and reflective waveguiding via a lensing duct constructed from inexpensive glass or plastic.

SUMMARY OF THE INVENTION

It is an object of the present invention to provide a means for increasing the intensity of a light beam.

A further object of the invention is to provide means to condense or intensify light using a combination of front surface lensing and reflective waveguiding.

A further object of the invention is to provide a lensing duct that focus down a beam from a diode array to produce a smaller beam with greater intensity.

Another object of the invention is to provide a lensing duct for coupling of diode array pump light to solid state lasing materials.

Another object of the invention is to provide a lensing duct which tapers down from a wide input side to a narrow output side, with the input side being of a curved shape and coated with an antireflective coating for more efficient transmission of light into the duct.

Another object of the invention is to provide a lensing duct to intensify light wherein the input side is lens-shaped and coated with an antireflective coating and the sides prevent light from escaping by total internal reflection as it travels through the duct to the output side thereof.

Other objects and advantages of the present invention will become apparent from the following description and accompanying drawings. Basically the invention is a lensing duct used to condense (intensify) light using a combination of front surface lensing and reflective waveguiding. The lensing duct may be constructed of any material which is optically transparent and has the ability to be polished, and thus may be fabricated from inexpensive glass and plastic. The lensing duct is particularly applicable for coupling of diode array pump light to solid state lasing materials, but can be utilized in any application which requires focusing down a beam of light to produce a smaller beam with greater intensity.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is directed to a device used to condense (intensify) light using a combination of front surface lensing and reflective waveguiding. More specifically, the invention is a lensing duct positioned in a beam of light to produce a smaller beam with greater intensity. The lensing duct is adapted, for example, to be positioned between a laser diode array and a rod of laser medium to intensify the light produced by the diode array on the laser medium to enhance pumping of the laser medium. The lensing duct tapers down from a wide input end or side to a narrow output end or side, with the input end or side being curved or lens-shaped and coated with an antireflective coating for more efficient transmission into the duct, with the sides preventing light from escaping by total internal reflection as it travels through the duct to the output end or side which may or may not be antireflective coated. As pointed out above, the lensing duct is particularly applicable for increasing the intensity of a laser diode beam used to pump solid state lasers. The lensing duct may be constructed of glass, plastic, or other materials which are optically transparent and has the ability to be polished.

Figure 1:
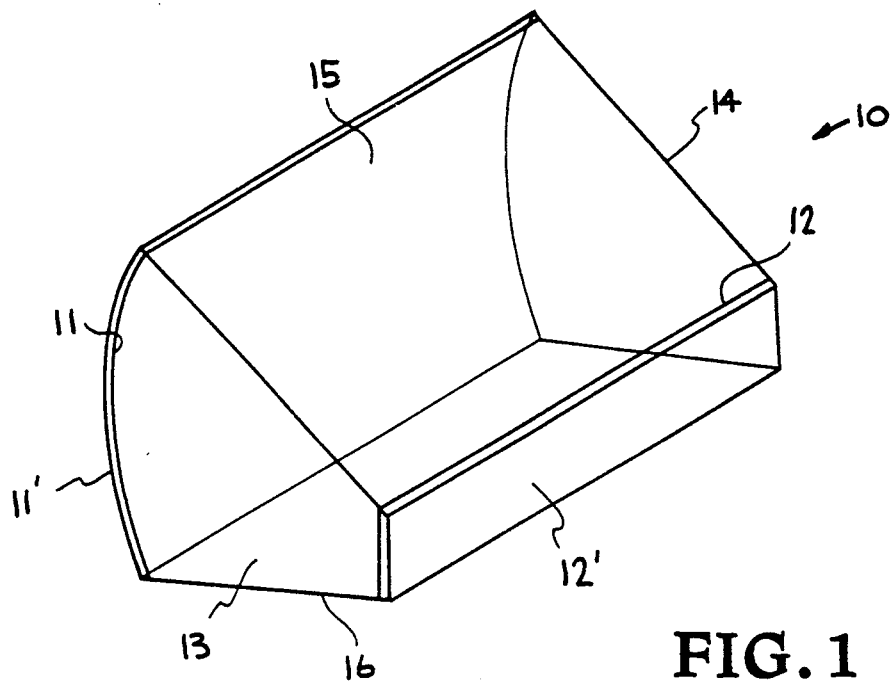
FIG. 1 is a perspective view of an embodiment of a lensing duct made in accordance with the present invention.
Figure 2:
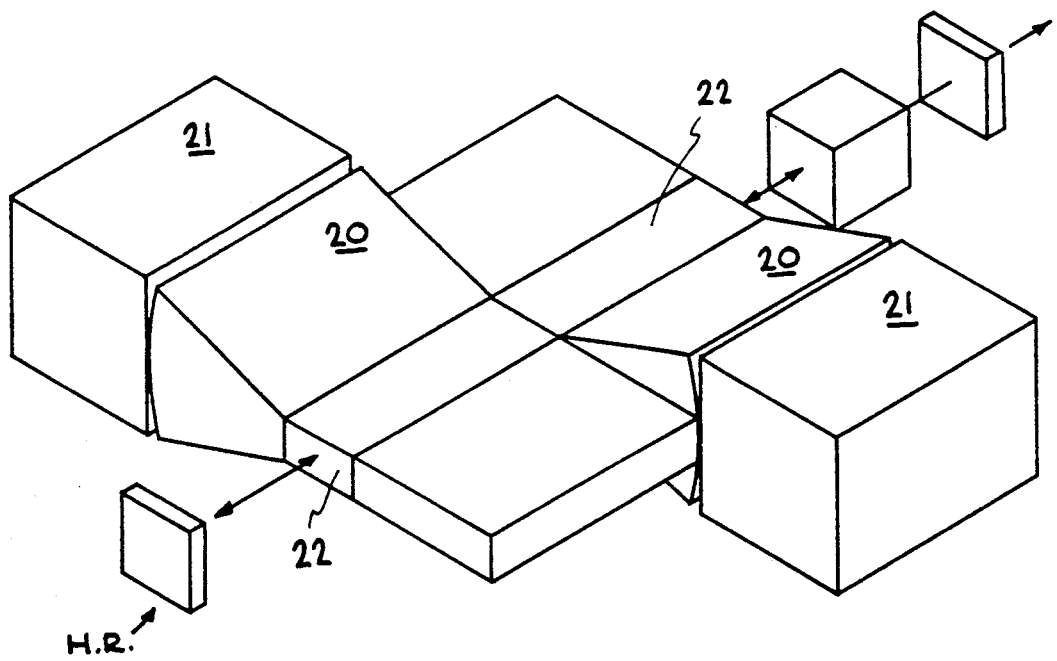
FIG. 2 is a view of a diode pumped laser oscillator utilizing a lensing duct similar to that of FIG. 1 for coupling two-dimensional diode pump array radiation to a rod of solid state lasing material.

Referring now to the drawings, FIG. 1 illustrates an embodiment of the lensing duct of the present invention with the lensing duct of FIG. 1 being utilized in the diode pumped laser oscillator of FIG. 2. The lensing duct generally indicated at 10 includes an input side or end 11, an output side or end 12, and interconnecting sides or surfaces 13, 14, 15 and 16. Input side or end 11 is curved or lens-shaped and coated, as indicated at 11', with an antireflective material for more efficient transmission of light into the lensing duct. Output side or end 12 is a flat configuration and includes an antireflective coating indicated at 12', which may be omitted if desired for certain applications. The sides or surfaces 13–16 are flat and configured so as to form a taper down from the width of input side or end 11 to the width of output side or end 12, and are not coated as light is prevented from escaping by total internal reflection at these surfaces as it travels towards output end 12. The sides or surfaces 13-16 perform a waveguide function in channeling the light from end 11 to end 12.

In the FIG. 1 embodiment, each of the sides 13 and 14 are tapered such that output end 12 is centrally located relative thereto so as to provide uniformity of light convergence from the input to the output of duct 10 onto a side surface of a laser rod as seen in FIG. 2. By comparison, each of the four sides of the lensing duct of the FIG. 3 embodiment are tapered so that the light converges onto an end surface of a laser rod.

By way of example, the lensing duct 10 may be fabricated from glass, plastic, or other material which is optically transparent and can be polished. The curvature of the face of input side or end 11 is dependent on the specific application, and for the application illustrated in FIG. 2, the radius of curvature is 1.33 cm. The length of the lensing duct 10 is also dependent on the specific application with the duct being designed to focus the light from input 11 onto the laser rod surface adjacent output 12. Generally, the length can be determined by the formula:

$$L = \alpha \frac{nR}{n-1}$$

where L is the length, n is the index of the refraction of the duct material, R is the radius of curvature of the input face and $\alpha$ is a numerical optimization factor that may change depending on the particular embodiment of the lensing duct. In general $\alpha$ will be near to but less than unity such that the output face of the lensing duct is located at the circle of least confusion when the lensing duct is viewed as an immersion lens. In the embodiment of FIG. 1 as utilized in the system of FIG. 2, the length is 3 cm, the index of refraction of glass is 1.51, and the radius of curvature of the face of input end 11 is 1.33 cm. The anti-reflective coating on input end 11 is magnesium fluoride ($MgF_2$), with a thickness of 3000 Å, but may be any other optical thin film antireflective coating.

FIG. 2 illustrates a diode pumped neodymium ($Nd^{3+}$):yttrium lithium fluoride (YLF) laser oscillator utilizing a pair of lensing ducts 10 of FIG. 1 as coupling optics 20 between diode pumps 21 and the laser (YLF) rods 22. The components of the FIG. 2 laser oscillator, except of the lensing ducts (coupling optics) 20, do not constitute part of the invention and is illustrated only to set forth a use for which the lensing duct is particularly suited. However, for further details of the FIG. 2 laser oscillator, attention is directed to R. Beach et al., "Passively Q-Switched transverse-diode-pumped $Nd^{3+}$:YLF laser oscillator", Optics Letters, Vol. 17, No. 2, Jan. 15, 1992.

Figure 3:
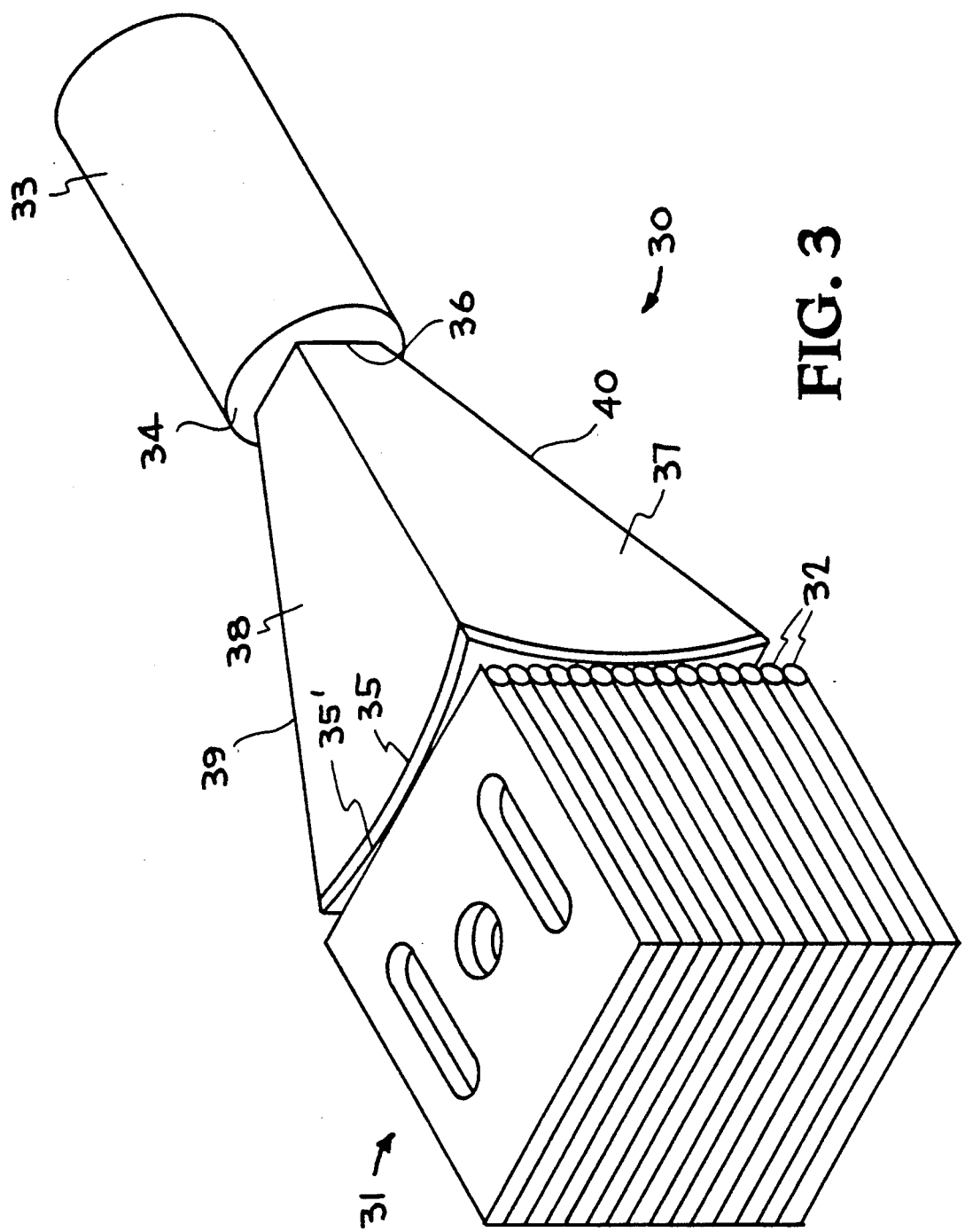
FIG. 3 is a preferred embodiment of the lensing duct of the invention in a system using a stack of micro-channel diode lasers and micro-lenses for directing light onto an end of a laser rod.

FIG. 3 illustrates a preferred embodiment of the invention for use between a stack of diode lasers and the end of a solid rod of lasing material. A lensing duct 30 is positioned intermediate a stack of micro-channel cooled diode lasers 31 utilizing micro-channel lenses 32 and a $Nd^{3+}$:YLF laser rod 33. the lensing duct 30 is configured to condense (intensify) light from the diode lasers 31 onto an end 34 of laser rod 33 and includes an input end 35, output end 36 and sides on surfaces 37, 38, 39 and 40 (sides 39 and 40 being opposite sides 37 and 38). As in the FIG. 1 embodiment the input end is curved and provided with a coating 35' of antireflective material, the output end is flat, and may be provided with an antireflective coating similar to coating 12' in FIG. 1, and the sides 37-40 are not coated as light is prevented from escaping by total internal reflection at these surfaces or sides. Each of the sides 37-40 are flat, but taper down from input 35 to output end 36.

By way of example, the lensing duct 30 (not shown to scale) is constructed of BK7 glass with the input end 35 having a cross-section of 7.0 cm × 1.1 cm and radius of 5 cm, the output end 36 having a cross-section of 0.45 cm × 0.45 cm. The antireflective coating may be of the same material and of the same thickness as in FIG. 1. Under certain applications it may be beneficial to also coat the end or side 36 with antireflective material.

It has thus been shown that the present invention provides a simple, effective, and inexpensive means for intensifying light. The invention is particularly applicable for increasing the intensity of a laser diode beam when diode lasers are used to pump solid state lasers.

While particular embodiments, materials, parameters, etc., have been illustrated and/or described, such is not intended to limit the invention to that illustrated or described. For example the lensing duct may be of a tapering cylindrical configuration with the reflective sides being defined by the cylindrical surface. Modifications and changes will become apparent to those skilled in the art, and the scope of the invention should be limited only by the scope of the appended claims.

We claim:

1. Means for intensifying a light beam by front surface lensing and reflective waveguiding comprising:
    a lensing duct constructed of a material which is optically transparent and can be polished;
    said lensing duct including an input end, an output end, and a plurality of continuously extending flat sides interconnecting said input and output ends;
    said input end being of a greater cross-section than said output end and including a coating of antireflective material; and
    said plurality of sides being uncoated and preventing light from escaping by reflective waveguiding due to internal reflection of the light beam.

2. The means of claim 1, wherein said input end of said lensing duct has a curved face.

3. The means of claim 1, wherein at least one of said continuously extending flat sides tapers down from said input end to said output end.

4. The means of claim 1, wherein said plurality of sides of said lensing duct comprises four sides, and wherein two opposite sides are tapered from said input end to said output end.

5. The means of claim 4, wherein said input end includes a curved face.

6. The means of claim 4, wherein each said plurality of sides is tapered from said input end to said output end.

7. The means of claim 6, wherein said input end includes a curved face.

8. The means of claim 1, wherein said material of said lensing duct is selected from the group consisting of glass and plastic.

9. The means of claim 8, wherein said antireflective material is $MgF_2$.

10. The means of claim 9, wherein said antireflective material has a thickness of about 3000 Angstroms.

11. The means of claim 1, wherein said lensing duct has a length, L, defined by the formula $L = \alpha$ $nR/(n-1)$, wherein $\alpha$ is a numerical optimization factor, n is the index of refraction of the duct material, and R is the radius of the curvature of the input end face.

12. A lensing duct for intensifying a light beam comprising a block of material which is optically transparent and can be polished, said block comprising:
   a curved input end having an antireflective coating thereon, and an output end, said input and output ends being connected by uncoated sides which perform a waveguide function;
   said uncoated sides each defining a continuous flat surface; and
   said curved input end of said block having a greater cross-section than said output end of said block.

13. The lensing duct of claim 12, wherein said block of material is constructed from the group consisting of glass and plastic.

14. The lensing duct of claim 13, wherein at least one of said flat surfaces is tapered.

15. A means for intensifying a laser diode beam by front surface lensing and reflective waveguiding onto a solid state laser rod comprising:
   a lensing duct fabricated from optical transparent material which can be polished and having an input and an output end interconnected by a continuous tapering section for focusing down a beam from a laser diode array onto a solid state laser rod;
   said input end being provided with an anti-reflective coating, and said tapering section being uncoated and producing reflective waveguiding by internal reflection of the beam.

16. The means of claim 15, wherein said material is selected from the group consisting of glass and plastic.

17. The means of claim 16, wherein said antireflective coating is $MgF_2$.

18. The means of claim 17, wherein said antireflective coating has a thickness of about 3000 Angstroms.

19. The means of claim 18, wherein said tapering section comprises four sides, at least two of said sides tapering down from said input end to said output end.

20. The means of claim 19, wherein said lensing duct has a curved input end face and has a length, L, defined by the formula $L = \alpha nR/(n-1)$, where $\alpha$ is a numerical optimization factor, n is the index of refraction of the material, and R is the radius of curvature of the curved face of said input end.

* * * * *